United States Patent
Natanzon et al.

(10) Patent No.: US 10,936,435 B2
(45) Date of Patent: Mar. 2, 2021

(54) AUTOMATICALLY SETTING A DYNAMIC BACKUP POLICY IN A CLOUD ENVIRONMENT

(71) Applicant: EMC IP Holding Company LLC, Hopkinton, MA (US)

(72) Inventors: Assaf Natanzon, Tel Aviv (IL); Michael Rhodes, Stamford, CT (US); Antony Bett, Shrewsbury, MA (US); Luay Al-Alem, Lynnfield, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/035,246

(22) Filed: Jul. 13, 2018

(65) Prior Publication Data

US 2020/0019471 A1 Jan. 16, 2020

(51) Int. Cl.
| | |
|---|---|
| *G06F 11/14* | (2006.01) |
| *G06F 11/30* | (2006.01) |
| *G06F 8/60* | (2018.01) |
| *G06F 9/54* | (2006.01) |
| *G06F 21/60* | (2013.01) |

(52) U.S. Cl.
CPC .......... *G06F 11/1461* (2013.01); *G06F 8/60* (2013.01); *G06F 9/542* (2013.01); *G06F 11/1464* (2013.01); *G06F 11/302* (2013.01); *G06F 21/60* (2013.01); *G06F 2201/86* (2013.01)

(58) Field of Classification Search
CPC ............... G06F 3/00; G06F 3/06–0689; G06F 5/00–16; G06F 9/00–548; G06F 11/00–3696; G06F 12/00–16; G06F 13/00–4295; G06F 16/00–986; G06F 17/00–5095; G06F 21/00–88; G06F 2003/0691–0698; G06F 2009/3883; G06F 2009/45562–45595; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153
See application file for complete search history.

(56) References Cited

U.S. PATENT DOCUMENTS

| | | | | |
|---|---|---|---|---|
| 7,707,619 | B2* | 4/2010 | Shelest | H04L 63/10 726/1 |
| 7,840,595 | B1* | 11/2010 | Blitzer | G06F 11/1458 707/781 |
| 7,840,992 | B1* | 11/2010 | Dufrene | G06F 11/1461 726/1 |
| 7,900,201 | B1* | 3/2011 | Qureshi | G06N 5/048 717/174 |

(Continued)

OTHER PUBLICATIONS

H. Li, F. Xiao and N. Xiong, "Efficient Metadata Management in Block-Level CDP System for Cyber Security," in IEEE Access, vol. 7, pp. 151569-151578, 2019 (Year: 2019).*

*Primary Examiner* — Daniel C. Chappell
(74) *Attorney, Agent, or Firm* — Workman Nydegger

(57) ABSTRACT

Systems and methods for performing data protection operation on an application in a manner that is integrated with the environment of the application being protected. A dynamic policy is associated with the data protection application so that a data protection operation can be performed whenever the policy is triggered.

19 Claims, 3 Drawing Sheets

(56) References Cited

U.S. PATENT DOCUMENTS

| | | | | |
|---|---|---|---|---|
| 7,930,727 | B1* | 4/2011 | Baize | G06F 21/562 |
| | | | | 726/1 |
| 8,689,282 | B1* | 4/2014 | Oprea | H04L 63/20 |
| | | | | 726/1 |
| 9,405,481 | B1* | 8/2016 | Cohen | G06F 3/0619 |
| 9,525,564 | B2* | 12/2016 | Lee | H04L 12/4641 |
| 9,760,445 | B1* | 9/2017 | Chopra | G06F 3/0683 |
| 9,846,698 | B1* | 12/2017 | Panidis | G06F 16/125 |
| 9,880,757 | B1* | 1/2018 | Banerjee | G06F 3/067 |
| 10,049,220 | B1* | 8/2018 | Hatsutori | H04L 63/1416 |
| 10,129,172 | B1* | 11/2018 | Stafford | H04L 67/1044 |
| 10,255,137 | B1* | 4/2019 | Panidis | G06F 11/1453 |
| 10,348,767 | B1* | 7/2019 | Lee | H04L 63/1441 |
| 10,382,401 | B1* | 8/2019 | Lee | H04L 67/10 |
| 10,394,795 | B2* | 8/2019 | Johnston | G06F 16/2358 |
| 10,541,938 | B1* | 1/2020 | Timmerman | H04L 43/065 |
| 10,693,856 | B2* | 6/2020 | Cox, Jr. | H04L 51/046 |
| 10,771,495 | B2* | 9/2020 | Mestha | H04L 63/1441 |
| 2006/0171418 | A1* | 8/2006 | Casini | H04B 7/18582 |
| | | | | 370/474 |
| 2007/0168715 | A1* | 7/2007 | Herz | G06F 11/1461 |
| | | | | 714/13 |
| 2008/0307525 | A1* | 12/2008 | Nickle | G06Q 10/06 |
| | | | | 726/22 |
| 2011/0161848 | A1* | 6/2011 | Purcell | G06F 21/554 |
| | | | | 715/764 |
| 2014/0358935 | A1* | 12/2014 | Prahlad | G06F 11/1466 |
| | | | | 707/741 |

* cited by examiner

AUTOMATICALLY SETTING A DYNAMIC BACKUP POLICY IN A CLOUD ENVIRONMENT

FIELD OF THE INVENTION

Embodiments of the present invention relate to systems and methods for protecting data. More particularly, embodiments of the invention relate to systems and methods for backing up data and to systems and methods for setting and/or implementing dynamic backup policies for backup operations.

BACKGROUND

In order for computing systems to be useful, they require applications and data. Data in particular has value and is the basis of many computing activities. As a result, prudence dictates that the data and applications should be protected. It is well known, for example, that computing systems are under attack, and are vulnerable to worms, ransomware, and the like. Computing systems may also simply fail. As a result, it is advisable if not necessary to ensure that the data is protected. This is typically achieved by backing up the application/data. This allows the application/data to be restored if necessary.

Today, backup systems are often based on schedulers. A user may select a backup policy and copies of the data (or more generally the applications) are generated in accordance with the selected policy. For example, a backup operation operating according to a schedule may create one copy of the application/data on a daily basis. However, there are situations where a daily backup may not provide sufficient protection.

For example, a schedule-based backup system may not adequately protect an application/data in certain environments such as container based architectures or function as a service based applications because these can change rapidly for various reasons. As a result, conventional schedule-based backups underperform and, as a consequence, the application/data may not be sufficiently protected.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
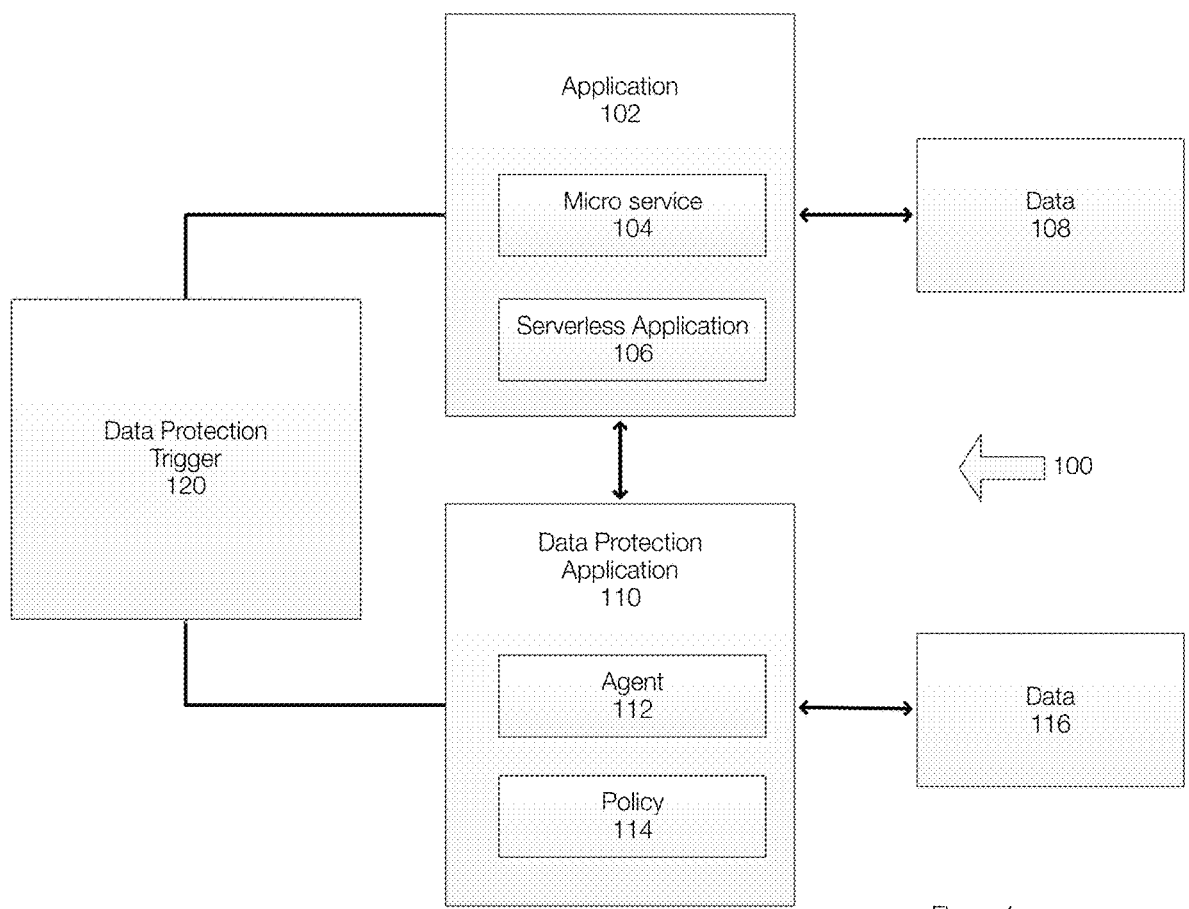
FIG. 1 illustrates a diagram of a dynamic policy based data protection application.

Embodiments of the invention relate to systems and methods for performing data protection operations, which include at least backup operations and restore operations. In particular, embodiments of the invention relate to systems and methods for automatically setting or for dynamically adjusting a policy that controls or governs data protection operations in a computing environment such as a cloud native environment. More specifically, embodiments of the invention allow a backup policy to dynamically cause data protection operations to be performed based on triggers or detected events.

Embodiments of the invention also relate to setting dynamic data protection policies in a cloud native environment. A cloud native environment references, by way of example, applications that are built and run or executed in a cloud based system. A cloud native application is distinct from other types of applications because the underlying concern relates to how the application is built and executed with less emphasis on where the application resides. A cloud native application can offer scalable computing power, operates on demand and allows for the incorporation of advances in data and application services.

A platform may be used to build and operate cloud native applications. The platform may include, by way of example only, microservices, containers, continuous delivery, and the like or combination thereof.

Continuous delivery relates to the practice of providing small components or batches of software in a continuous and automated manner. This allows an entity to deliver software frequently and, at the same time, receive feedback from end users more quickly. Embodiments of the invention may create a backup or perform a different data protection operation each time a component is delivered or just prior to the delivery of the component or update. Each delivery may constitute a trigger or an event that results in a backup operation.

Microservices are an example of an architecture that is used to develop an application. In particular, the application is built as a collection or group of small services. Each service typically runs its own process and may communicate with other services using messaging or application programming interfaces (APIs) or using HTTP based commands. This independence allows each microservice to be deployed, upgraded, scaled and the like independently of other microservices that may be part of the same application. As a result, the microservices can be updated frequently without impacting end users. However, there is a danger that a particular update (or scaling, or removal, etc.) may cause unexpected problems. Embodiments of the invention may generate a backup whenever (or before) any of the microservices is updated, deployed, scaled, or the like.

The twelve factor app is an example of a methodology for building web-based applications including microservices. Microservices that are developed in accordance with this methodology can create a clear line between the stateful and the stateless parts of the application. Scaling, porting, and reconfiguring stateless processes can be done seamlessly using modern container orchestration like Docker (where the orchestration is done by tools like Kubernetes). Doing the same operations for stateful processes requires moving physical bits between the processes and maintaining their consistency. To scale a stateless process, another instance is executed. Scaling a stateful service involves setting network intensive distributed state protocols that are different from system to system. Stateful needs or requirements can be solved by focusing on popular stateful services and offering those services as dependencies to the applications.

Containers, which are also used in the development of web-based applications, offer both efficiency and speed compared with standard virtual machines (VMs). For example, a single OS instance can be dynamically divided between isolated containers. Containers allow microservices to be deployed efficiently and effectively.

Developing web-based applications or cloud based applications in container environments allow faster development and allow the software to be updated as often as liked. The fact that persistency layers may be external and provided by the platforms or the cloud providers, allow for the easy addition of a new persistent service, which needs to be protected for data corruption and disaster. A persistence layer, by way of example, may be a software layer that allows an application to more easily persist its state. Persistence layers are often useful, particularly where the state of an application may be required even after the process that created the state is completed.

Serverless applications may also be used in web or cloud-based applications and may incorporate microservices or containers. A serverless application may include three types of artifacts or components that are usually required for the serverless application to operate in production: backend services, application functions, and application function mapping.

Backend services include, for example, databases, object stores, persisted messaging services—every service that can store long term state for the application. For example: AWS S3, DynamoDB, Aurora, or Oracle database.

Application functions may include a set of stateless functions packaged as containers that will be invoked according to the application function mappings. The application functions can interact with the backend services to read and store state. For example—a python script that reads a photo from S3 and creates a thumbnail for the photo.

Application Function Mapping relates to the manner in which conditions are mapped to services. Serverless application may include a set of conditions that instruct the platform to activate the application functions. Common examples are reactions to events of backend services (e.g. object uploaded to an S3 bucket, transaction committed on a relational database, message sent to a queue) or assigned URL endpoint (e.g. when a post request arrives at my-app-dns/my-app-api/data). Conditions could be simple or include more complex filters. In addition, application functions can directly invoke other functions (downstream functions).

Cloud native applications and application architectures are changing the manner in which software is built and deployed. However cloud native systems also improve productivity and provide significant benefits. For example, ideas can be transformed into a product more quickly. Also, the applications can be scaled more quickly and easily.

Because an application (e.g., a web-based application or cloud native application) may include many independent parts or components, the application may be updated more frequently and it becomes difficult to perform data protection operations that adequately protect the application/data. In fact, some containers or components of an application may be changed independently of other containers or components in these types of systems.

In view of the fact that these types of applications can be updated dynamically, frequently (e.g., multiple times per day), and the like, schedule based backup operations may not provide sufficient protection. Embodiments of the invention relate to automatically setting dynamic backup policies in a cloud native environment. These policies are dynamic and allow the backup operation to respond to real time events and modern programming methodologies. Embodiments of the invention allow the backup application to be integrated with development processes, programming environments, deployment mechanisms, scaling operations, or the like. In addition, embodiments of the invention allow a production system to be simulated using real data More specifically, cloud native applications and architectures have enabled applications that can be updated, scaled, deployed, etc., more frequently. Further, because the applications may include independent containers or microservices, the updates can be made to specific portions (e.g., specific containers or microservices) of an application. Both function as a service (FAAS) and container based environments allow very fast development and thus there are much more software updates. Each application update is a possibility for data corruption, failure, interoperability issues, or the like.

New persistence mechanisms are also added easily: this means that a conventional backup strategy may not be correct after an upgrade. For example, there may be a bug related to understanding which new services need to be upgraded.

Next, there is much more automation in the deployment and testing aspect of cloud native applications. Cloud native applications may also be developed using CI/CD (Continuous Integration/Continuous Deployment or Delivery) tools, which are not integrated with the data protection systems.

Cloud native applications can be scaled up and down and this may affect the risk of a corruption or a crash of a persistent service (for example if the applications scales too much, a database may crash). Embodiments of the invention provide a technical solution to overcome these problems. Even though scheduled data protection operations can provide some protection, scheduled backups are often taken too infrequently or at non-optimal times, particularly for a cloud native environment.

Embodiments of the invention integrate data protection with the development, deployment, and/or runtime environments of applications. Embodiments of the invention may perform data protection operations dynamically or as needed. This may also be combined with scheduled data protection operations. For example, the data protection system may determine that a data protection operation should be performed based on environmental factors or triggers.

A backup, for example, may be created during deployment (of a new service, an upgrade, scaling, or the like). Integrating the data protection system with deployment may result in a system that includes creating a backup as part of the deployment process. For example, during blue-green deployment, two identical production environments are run (one called blue and one called green), but only one is live. In this case, a backup may be created before and/or during the deployment or whenever the software is upgraded in this or other deployments. A backup may be performed whenever a function (e.g., in Function as a Service or FAAS) is added, removed or modified.

Whenever an application is scaled (up or down), a backup operation may be performed. This can be achieved, by way of example, by integrating the backup into orchestration layers (e.g., kubernetes, which is a system for automating the deployment, scaling, and management of containerized applications).

In another example, a backup may be automatically created when there is a change in traffic (e.g., a change above/below a threshold) or off peak, when a health check fails, or where there is a pod or service failure.

The data protection system can also be integrated into the continuous integration and delivery pipeline. A backup may be created on every push to production. Copies of a production application (live) may be taken and used to run in integration or staging environments.

Data protection systems may be integrated with monitoring tools. A backup may be taken based on degradation in a cluster or in internal services or when there is an infrastructure outage or change.

Embodiments of the invention may include annotations related to when a backup should be performed. For example, when a portion of the code is reached, a backup may be initiated per the annotation. Metadata can be added to each backup to allow root cause analysis and restore based on events. For example, the metadata may indicate why a backup was performed. This may identify a system failure, hardware issue, deployment issue, scaling problem, or the like.

FIG. 1 illustrates an example of a system that is associated with a data protection system or into which a data protection system is integrated. FIG. 1 illustrates a computing system 100 that includes an application 102 (e.g., a could native application) or applications and a data protection application 110. The data protection application 110 is configured to perform data protection operations such as backup operations, restore operations, copy operations, or the like.

A microservice 104 and a serverless application 106 are examples of applications 102. Each of the applications 102 may be associated with their own data (represented as data 108) or with a service that maintains their data, such as a backend service.

The data protection application 110 may include or be associated with a backup server an agent 112 or other components. The agent 112 may be a part of the application or integrated with the application 102. The save sets generated during a backup operation are represented by data 116, which may be stored in the cloud. The save sets in the data 116 allow an application to be restored at various points of time.

The data protection application 110 may be a cloud native application. The application 102 and the data protection application 110 may include server computers, may be implemented in a datacenter, or may include other hardware necessary to perform network based communications, applications, and data transmissions.

In this example, the data protection application 110 includes or is associated with a policy 114 (or set of policies). The policy 114 may define when to perform a data protection operation such as a backup operation. The policy 114 may include conditions that, when met, result in a backup operation or other data protection operation. The policy 114 may identify triggers or events that cause a backup operation to be performed. The policy 114 can be dynamic and may be adjusted automatically.

For example, components (containers, microservices, etc.) may be added to, changed, upgraded, or removed from the application 102. When this is detected, the policy 114 may be automatically or dynamically updated to reflect the change in the application. In addition, this may trigger or cause a backup to be performed. Thus, the policy 114 may or may not identify the microservices, backend services, data, containers, etc., to be protected during a backup application. Alternatively, the policy 114 may include conditions that can be triggered based on events within the application 102 or in the deployment, scaling, upgrading, etc., of the application 102. The application 102 may be configured to notify the data protection application 110 when one of these events occurs.

By integrating the data protection application 110 into the application 102, data protection operations can become an automated part of the application 102. The data protection application 110 could also be integrated into processes associated with the application 102 such as upgrades, monitoring, testing, or the like.

The system 100 is also associated with data protection triggers 120 (triggers or events). When a trigger 120 is detected, determined, or received, the data protection application may perform a data protection operation on or for the application 102. For example, a software upgrade, software deployment, application scaling, and the like are examples of triggers that may result in a data protection operation.

Figure 2:
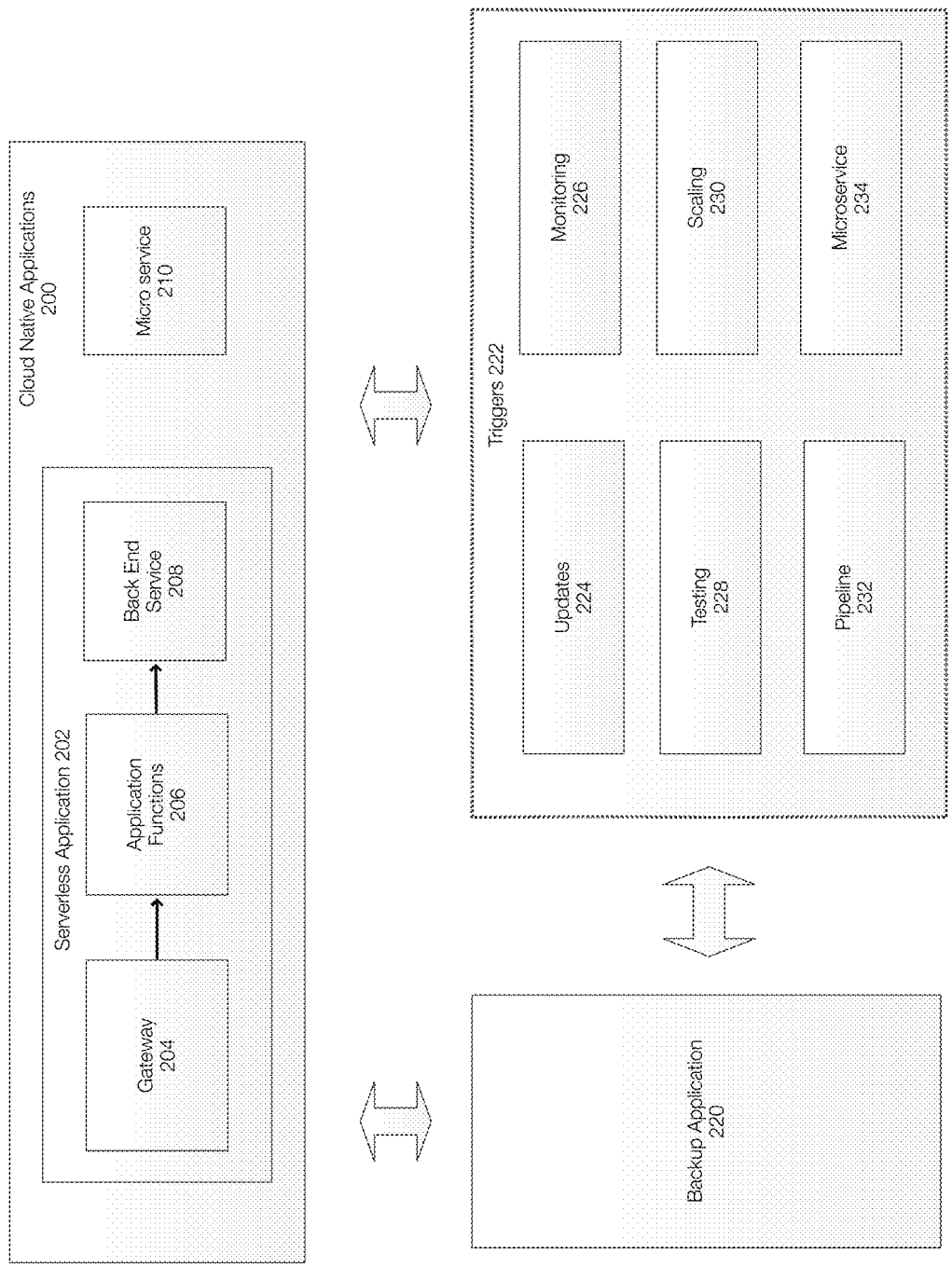
FIG. 2 illustrates another example of a policy based backup application that operates within or that protects cloud native applications.

FIG. 2 illustrates an example of a data protection system integrated with or associated with an application. FIG. 2 illustrates examples of cloud native applications 200, which include by way of example only a serverless application 202 and a microservice 210, or combinations thereof. In a cloud native application, a request may be detected by or received at a gateway 204. The gateway 204 may be a URL for example and the request may be an http request (e.g., put, post, get). The serverless application 204 may be cloud based and may be accessed by a client over the Internet or other network. Example clients include, but are not limited to, desktop computers, laptop computers, mobile devices, tablets, or the like.

The gateway 204 is configured to process the request with respect to application function mappings. In one example, the request may be parsed and mapped to functions by the gateway 204. Thus, the gateway 204 may map the request to one or more functions. After identifying the appropriate function or functions for the request 202, the applications functions 206 relevant to the request are invoked. The invoked functions may each be embodied as a container or a microservice, for example. The functions 206 then performs its corresponding function based on the request or based on information received from the gateway 204.

The function 206 (or functions) may be instantiated from a container image. The serverless application 202 or portions thereof may be embodied in ephemeral containers. The function 206 may interact with one or more backend services 208.

The trigger for the application function can be uploading an object or access to a URL. In one embodiment, the gateway may refer to the URL, the cloud FAAS service is the one making a call when trigger happens, the trigger can be access to URL (i.e. gateway), or uploading an object, a transaction being committed to a database, a message sent to a queue, or the like. The request may also be an http request (e.g., a post request).

The serverless application 202 may be backed up regularly, for example by a backup server or application 220 or other device. The server 220 may identify the components of the serverless application 202 and perform a backup of the components. The components and their relationships may be identified in a manifest. In addition, as changes to one or more of the components of the serverless application occur, these changes may be detected and the manifest may be updated or a new manifest may be generated. For example, a function embodied as a container may be upgrade. This upgrade is specific to the container and does not impact other containers in the serverless application 202. In this context, a backup may be performed when the upgrade is detected or before the upgrade is performed.

The serverless application 202 can be backed up by backing up all the services and functions (or all the containers) that the serverless application uses in addition to the data if necessary. Conventionally, this is a tedious error prone manual work that requires creating a lot of pieces of the backup software and coordinating all of the various pieces.

More specifically, the serverless application 202 may experience different types of changes or events or actions. Examples include triggers 222 such as updates 224, monitoring 226, testing 228, scaling 230, pipeline activities 232, and microservices 234. Because these triggers 222 are not necessarily scheduled, embodiments of the invention provide a dynamic backup policy that allows the application 202 (or more generally the applications 200) to be backed up when these triggers occur. These triggers 222 may be incorporated into a policy, such as the policy 114.

As previously stated, updates 224 may occur frequently in cloud native applications 200. Updates may occur to individual components of an application independently of other components of the application. When an update is detected or performed, a backup operation may be performed before the update if a backup does exist. This allows the upgrade to be reversed if necessary. A backup may also be performed after the update is complete.

The application may also be monitored 226 by monitoring tools. Monitoring tools, for example, may monitor performance, changes in throughput, response times, hardware status (hardware failure) or the like. The data protection system can be integrated with the monitoring tools. This allows a backup to be created when there is a degradation in the application (e.g., in a server cluster, in internal services, etc.) or when an aspect of the application being monitored falls below (or exceeds) a threshold. In another example, a backup may be created when there is a change in the infrastructure or when there is an infrastructure outage (e.g., failure of a network switch or the like). When an outage is detected, a backup may be created. A backup may be created whenever there is a change in traffic or during off peak use or the like.

Backups may also be used for testing 228. A copy of the production application can be made for testing purposes. When an upgrade is prepared, a backup copy of the production data may be obtained and used for testing purposes. This allows tests to be performed on the latest versions of the application or the currently running version of the application. In addition, the backup can be tested in an environment that is similar to the environment of the live application.

The policy 214 may be configured to cause a backup to be performed when the application is scaled up or down when scaling 230 is a trigger. In this example, the data protection system can be integrated with the orchestration layers such that any type of deployment or scaling can also result in the creation of a backup.

The data protection system or application 220 can be integrated into a CI/CD pipeline. A backup may be generated before a push to production. Similarly, backups of the production application can be used to run in integration or staging environment. Thus, the pipeline may include pushing an update or change to a staging environment before pushing the update to production.

A microservice 234 may also initiate a backup. A developer may annotate when a backup is required in the code.

In addition, metadata can be added to the backups such that root cause analysis and restore can be performed based on events.

Figure 3:
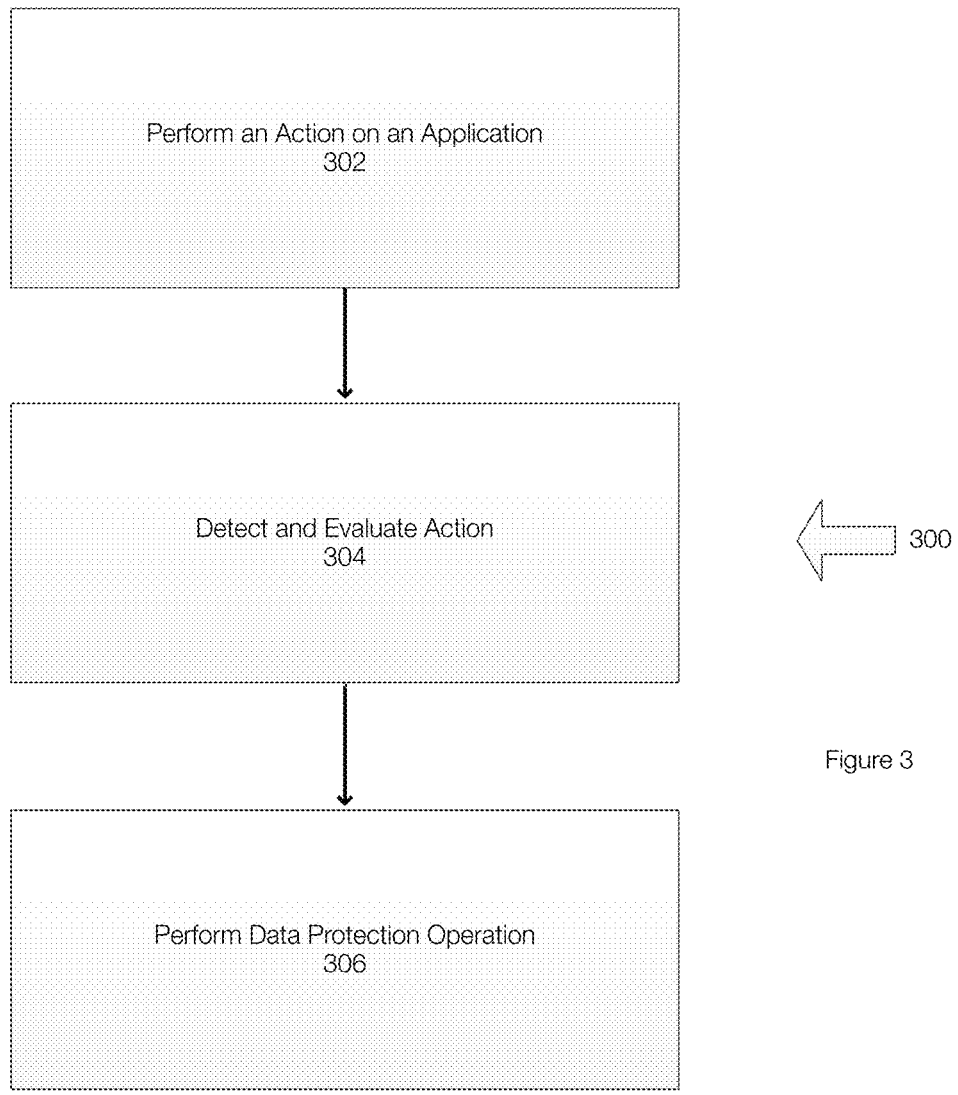
FIG. 3 is a flow diagram illustrating an example of a method for dynamically setting policies that may govern or control data protection operations.

FIG. 3 illustrates an example of a method for performing a data protection operation. The method 300 can be implemented both when the data protection application is associated with the application and when the data protection application is integrated with the application or processes associated with the application. For example, the data protection application can be integrated into monitoring processes, orchestration processes, deployment processes, upgrade processes, or the like or combination thereof.

During normal operation, an action is performed on an application 302. The action may also be a trigger. The action or trigger may be, as previously stated, upgrading the application or a portion of the application, deploying the application or a portion of the application or a new aspect of the application, scaling the application, testing the application in a production or staging environment, monitoring the application, or the like or combination thereof.

The action is then detected 304. Alternatively, the application may send a notification that the action is occurring. Thus, detecting the action may occur when the data protection application is called by the application. For example, the orchestration processes may include code that calls the data protection application when a component is upgraded, scaled, or the like.

The detected action is then evaluated in light of the policy. The policy may determine whether or not a backup or other data protection operation is actually performed. For example, a backup may not be created if a backup was recently performed (e.g., within a specified time period). A backup may not be created if scaling is not greater than a certain percentage. Alternatively, a backup may be performed whenever a trigger is detected/received/occurs.

Once the action is detected and evaluated, the data protection operation is performed 306.

Advantageously, embodiments of the invention create backups that are more integrated with the environments. Further, the frequency at which backups occur do not necessarily increase the backup sizes significantly, but reduce data loss.

For example, when an application is upgraded multiple times per day, multiple backups may be generated. However, these backups can be incremental backups such that the overall size of the backup is not significantly increased. At the same time, the data loss is minimized because there is a backup for each detected event or trigger.

Example Computing Devices and Associated Media

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon.

Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing a backup operation on a cloud based application operating in a cloud-based environment, the method comprising:
    integrating a data protection application into a deployment of the cloud based application, a development of the cloud based application, a runtime of the cloud based application, and a runtime environment of the cloud based application, wherein the data protection application is configured to detect actions to be performed in the deployment, the development, the runtime and the runtime environment of the application, wherein the deployment is associated with a continuous integration and a continuous development pipeline;
    determining that an action is to be performed at least one of the deployment, development, runtime or runtime environment of the cloud based application;
    evaluating the action, based on a policy, to determine whether to perform the backup operation, wherein the policy defines conditions that, when satisfied, trigger the backup operation;
    performing, by the data protection application, the backup operation on the cloud based application or on the portion of the cloud based application to generate a backup of the application when the action satisfies the policy.

2. The method of claim 1, further comprising receiving a notification that the action is to be performed.

3. The method of claim 1, wherein the action includes one of an upgrade to a component of the cloud based application, a scaling of the cloud based application, or an addition to the cloud based application.

4. The method of claim 1, wherein the action includes a push to production.

5. The method of claim 1, wherein determining that an action is to be performed on an cloud based application includes monitoring the cloud based application and determining that a monitoring event has occurred.

6. The method of claim 5, wherein the monitoring event includes at least one of crossing a threshold related to traffic, detecting a hardware outage, or detecting a hardware change.

7. The method of claim 1, further comprising updating the policy dynamically based on the action or other actions related to the cloud based application.

8. The method of claim 1, further comprising integrating the cloud based application with a data protection application.

9. The method of claim 1, wherein performing the backup operation includes automatically creating a backup whenever there is a deployment or whenever the cloud based application is upgraded or whenever a function is added or modified.

10. The method of claim 1, wherein performing the backup operation includes automatically creating a backup whenever the cloud based application is scaled.

11. The method of claim 1, wherein performing the backup operation includes creating a backup whenever there is a change in traffic or a service failure of a failed health check on the cloud based application.

12. The method of claim 1, wherein the data protection application performing the backup operation is integrated with monitoring tools, wherein performing the backup operations includes creating a backup on prior to each push to production.

13. The method of claim 1, further comprising running the backup operation to create the backup in an integration or staging environment.

14. The method of claim 1, further comprising performing the backup operation on degradation of a cluster or based on an infrastructure outage.

15. The method of claim 1, wherein performing the backup is initiated by a microservice.

16. The method of claim 15, wherein code of the cloud based application is annotated with a backup indicator, further comprising performing the backup operation application when the backup indicator is reached during execution of the code.

17. The method of claim 1, further comprising monitoring services included in the cloud based application and performing the backup application without disturbing underlying code of the monitored services.

18. A non-transitory computer readable medium comprising computer readable instructions for performing operations for performing a backup operation on a cloud based application operating in a cloud-based environment, the operations comprising:
   integrating a data protection application into a deployment of the cloud based application, a development of the cloud based application, a runtime of the could based application, and a runtime environment of the cloud based application, wherein the data protection application is configured to detect actions to be performed in the deployment, the development, the runtime and the runtime environment of the application, wherein the deployment is associated with a continuous integration and a continuous development pipeline;
   determining that an action is to be performed in at least one of the deployment, development, runtime or runtime environment of the cloud based application;
   evaluating the action, based on a policy, to determine whether to perform the backup operation, wherein the policy defines conditions that, when satisfied, trigger the backup operation;
   performing, by the data protection application, the backup operation on the cloud based application or on the portion of the cloud based application to generate a backup of the application when the action satisfies the policy.

19. A method for performing a backup operation on a cloud based application operating in a cloud-based environment, the method comprising:
   determining that an action is to be performed on the cloud based application or on a portion of the cloud based application, wherein the action is performed in at least one of a deployment, a development, or a runtime of the cloud based application wherein the data protection application is configured to detect actions to be performed in the deployment, the development, and the runtime of the application, wherein the deployment is associated with a continuous integration and a continuous development pipeline;
   evaluating the action, based on a policy, to determine whether to perform the backup operation, wherein the policy defines conditions that, when satisfied, trigger the backup operation;
   performing, by a data protection application, the backup operation on the cloud based application or on the portion of the cloud based application to generate a backup when the action satisfies the policy; and
   including metadata in the backup that indicates why the backup operation was performed and that allows root cause analysis.

* * * * *